United States Patent
Li et al.

(10) Patent No.: US 11,171,702 B2
(45) Date of Patent: Nov. 9, 2021

(54) ACCESS NODES AND BEAMFORMING METHOD FOR RECEIVING AND TRANSMITTING SIGNALS IN WIRELESS COMMUNICATION NETWORK

(71) Applicant: Telefonaktiebolaget LM Ericsson (publ), Stockholm (SE)

(72) Inventors: Gen Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/514,751

(22) PCT Filed: Sep. 30, 2014

(86) PCT No.: PCT/CN2014/087888
§ 371 (c)(1),
(2) Date: Mar. 27, 2017

(87) PCT Pub. No.: WO2016/049840
PCT Pub. Date: Apr. 7, 2016

(65) Prior Publication Data
US 2017/0244460 A1    Aug. 24, 2017

(51) Int. Cl.
*H04B 7/06* (2006.01)
*H04W 72/04* (2009.01)
*H04W 84/04* (2009.01)

(52) U.S. Cl.
CPC ........ *H04B 7/0619* (2013.01); *H04W 72/042* (2013.01); *H04W 72/0413* (2013.01); *H04W 84/042* (2013.01)

(58) Field of Classification Search
CPC . H04B 7/0619; H04B 7/084; H04W 72/0413; H04W 72/042; H04W 84/042
See application file for complete search history.

(56) References Cited

U.S. PATENT DOCUMENTS 9,923,682 B2 * 3/2018 Jeong ............... H04L 5/0023
2010/0033374 A1 * 2/2010 van Rensburg ...... H01Q 1/246
342/368

(Continued)

FOREIGN PATENT DOCUMENTS

EP          2403286 A1    1/2012
KR     20140016854 A      2/2014

(Continued)

*Primary Examiner* — Jeffrey M Rutkowski
*Assistant Examiner* — Jasper Kwoh
(74) *Attorney, Agent, or Firm* — Murphy, Bilak & Homiller, PLLC (57) ABSTRACT

The invention relates to a server radio node (110) and a client radio node (120) and methods performed in the server radio node (110) and the client radio node (120) for receiving and transmitting signals in a wireless communication network (100) are provided. The server radio node (110) determines a receiving time-spatial sweeping pattern for the server radio node (110). The client radio node (120) determines a transmitting time-spatial pattern based on a predefined rule. The server radio node (110) receives the signals from the client radio node (120) based on the receiving time-spatial sweeping pattern. The signals are transmitted by the client radio node (120) according to the determined transmitting time-spatial pattern.

50 Claims, 9 Drawing Sheets

(56) References Cited

U.S. PATENT DOCUMENTS

| | | |
|---|---|---|
| 2010/0103045 A1 | 4/2010 | Liu et al. |
| 2010/0265925 A1 | 10/2010 | Liu et al. |
| 2011/0007640 A1 | 1/2011 | Taghavi et al. |
| 2011/0007721 A1* | 1/2011 | Taghavi Nasrabadi ............... H04W 72/046 370/338 |
| 2011/0076955 A1 | 3/2011 | Uno et al. |
| 2011/0096745 A1* | 4/2011 | Ahn ............... H04L 5/0016 370/329 |
| 2012/0057575 A1* | 3/2012 | Taghavi Nasrabadi ............... H04B 17/12 370/338 |
| 2012/0307738 A1* | 12/2012 | Morioka ............. H04B 7/086 370/328 |
| 2013/0040684 A1 | 2/2013 | Yu et al. |
| 2013/0045690 A1* | 2/2013 | Seol ............... H04B 7/0417 455/63.4 |
| 2013/0072243 A1 | 3/2013 | Yu et al. |
| 2013/0223487 A1* | 8/2013 | Zhou ............... H04B 7/0695 375/219 |
| 2013/0301567 A1 | 11/2013 | Jeong et al. |
| 2014/0254515 A1 | 9/2014 | Kim et al. |
| 2014/0323143 A1* | 10/2014 | Jung ............... H04B 7/0617 455/452.1 |
| 2014/0376466 A1* | 12/2014 | Jeong ............... H04W 74/0833 370/329 |
| 2015/0215825 A1* | 7/2015 | Kim ............... H04W 36/0088 370/331 |
| 2015/0365155 A1* | 12/2015 | Subramanian ....... H04B 7/0695 370/329 |
| 2015/0365814 A1* | 12/2015 | El Ayach ............. H04W 16/28 370/254 |
| 2016/0087765 A1* | 3/2016 | Guey ............... H04L 27/2607 370/330 |

FOREIGN PATENT DOCUMENTS

| | | |
|---|---|---|
| WO | 2010027865 A2 | 3/2010 |
| WO | 2012122113 A1 | 9/2012 |
| WO | 2014124237 A1 | 8/2014 |

\* cited by examiner

ACCESS NODES AND BEAMFORMING METHOD FOR RECEIVING AND TRANSMITTING SIGNALS IN WIRELESS COMMUNICATION NETWORK

TECHNICAL FIELD

Embodiments herein relate to a server radio node, a client radio node, a wireless communication network, and methods therein. In particular, they relate to beamforming in the server radio node for detecting signals from the client radio node in the wireless communication network.

BACKGROUND

Wireless communication networks or systems, such as Millimeter-Wave (MMVV) wireless systems, operating at high frequencies from 30-300 GHz, are emerging as a promising technology to meet exploding bandwidth requirements by enabling multi-Gb/s speeds. For example, 5th Generation (5G) oriented Long Term Evolution (LTE) or Ultra-Dense-Networks (UDN) will be most probably deployed in MMW band. At such high frequencies, a large number of antennas can be available at a transmitter, a receiver, or both. In order to make up for the large propagation loss that typically occurs, beamforming becomes a very important feature in MMW systems. Beamforming is a signal processing technique used for directional signal transmission or reception. This is achieved by combining antenna elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is known as beamforming gain. When multiple antennas are available at transmitters, receivers or both, it is therefore important to apply efficient beam patterns to the antennas to better exploit the spatial selectivity of the corresponding wireless channel.

Communication devices, such as User Equipments (UE), operating in the wireless communication networks or systems, are also known as e.g. wireless terminals, mobile terminals and/or mobile stations, referred to as client radio nodes hereafter. The client radio nodes are enabled to communicate wirelessly in the wireless communication networks/systems which usually comprise multiple networks with access nodes, such as cellular communications networks with Second/Third Generation (2G/3G) network access nodes, 3G LTE network access nodes, and Worldwide interoperability for Microwave Access (WiMAX) network access nodes, etc. as well as wireless local networks, e.g. Wireless Local Area Networks (WLAN) and Wireless Personal Area Networks (WPAN) with access points. The communication may be performed e.g. between two client radio nodes, or between a client radio node and different access nodes or access points.

Beamforming may be applied to physical channels used to transmit data to client radio nodes once their positions are known to the network or system. For broadcast transmissions, such as system information, paging, common reference signals, and synchronization signals etc., which are targeting client radio nodes not yet known to the network or client radio nodes which positions are unknown to the network, beamforming may be more difficult to use. Simple beamforming cannot be applied since it is not known in which direction to apply the beamforming. One common way to address this problem is to transmit those signals using beamforming not just once but several times, each time in a different direction. This procedure is also called beam sweeping. An example of a system applying beam sweeping is IEEE802.11ad, the Wi-Fi standard operating in the unlicensed 60 GHz band.

The wireless communication networks cover a geographical area which is divided into cell areas, each cell area being served by an Access Node (AN) or a Base Station (BS), or an Access Point (AP), hereafter referred to as a server radio node. The wireless communication networks may include a number of cells that can support communications for a number of UEs, i.e. client radio nodes. A fundamental requirement for any wireless systems is the possibility for a UE, or a client radio node, to request a connection setup, commonly referred to as Random Access (RA).

For the random access method in traditional LTE systems, the server radio node will detect the random access sequence with omni-directional receiving direction. This is not practical for MMW systems because there is large propagation loss in high frequency band and thus the random access signal cannot be reliably detected without using beamforming. Considering the large number of antenna elements at the server radio node side, the detection of a random access preamble in an uplink transmission could be clearly negatively impacted without effective utilization of receiving beamforming gain.

WO2010027865 discloses a method for beamforming used for 802.11ad systems, in which the receiving beam sweeping is performed for each user equipment or client radio node, which results in several disadvantages. First, this method causes large overhead. For example, N*M resource blocks will be needed to complete this receiving beam sweeping, where N is the number of sweeping beams in the server radio node and M is the number of client radio nodes. Such receiving beam sweeping may even require more resource blocks to be allocated to limit the collision ratio below a certain acceptable level. Second, the method causes interference. Such interference decreases the signal quality of other nodes, e.g. other server radio nodes or client radio nodes.

SUMMARY

It is therefore an object of embodiments herein to provide an improved method for a server radio node to receive random access requests or any other signals from a client radio node in a wireless communication network.

According to a first aspect of embodiments herein, the object is achieved by a method performed in a server radio node for receiving signals from a client radio node in a wireless communication network. The server radio node determines a receiving time-spatial sweeping pattern for the server radio node, and receives at least one signal from the client radio node based on the receiving time-spatial sweeping pattern. The at least one signal is transmitted by the client radio node according to a transmitting time-spatial pattern determined by the client radio node based on a predefined rule.

According to a second aspect of embodiments herein, the object is achieved by a method performed in a client radio node for transmitting signals to a server radio node in a wireless communication network. The client radio node determines a transmitting time-spatial pattern based on a predefined rule, and transmits at least one signal to the server radio node according to the determined transmitting time-spatial pattern.

According to a third aspect of embodiments herein, the object is achieved by a method in a wireless communication network for receiving and transmitting signals between a first radio node and a second radio node. The first radio node may be a server radio node and the second radio node may be a client radio node or vice versa. The first radio node determines a receiving time-spatial sweeping pattern when it operates as a server radio node. The second radio node determines a transmitting time-spatial pattern based on a predefined rule when it operates as a client radio node. The second radio node transmits a signal according to the determined transmitting time-spatial pattern. The first radio node detects the signal according to the defined receiving time-spatial sweeping pattern of the first radio node and sends a response to the second radio node when the signal is detected.

According to a fourth aspect of embodiments herein, the object is achieved by a server radio node for receiving signals from a client radio node in a wireless communication network. The server radio node is configured to determines a receiving time-spatial sweeping pattern and receive at least one signal from the client radio node based on the receiving time-spatial sweeping pattern. The at least one signal is transmitted by the client radio node according to a transmitting time-spatial pattern determined by the client radio node based on a predefined rule.

According to a fifth aspect of embodiments herein, the object is achieved by a client radio node for transmitting signals to a server radio node in a wireless communication network. The client radio node is configured to determine a transmitting time-spatial pattern based on a predefined rule and transmit at least one signal to the server radio node according to the determined transmitting time-spatial pattern.

Since a receiving time-spatial sweeping pattern is predetermined for the server radio node, and a transmitting time-spatial pattern is determined by the client radio node based on a predefined rule, their time-spatial relationship is known to the client radio node and the client radio node may transmit the at least one signal, e.g. random access preamble, when a beam of the receiving time-spatial sweeping pattern of the server radio node targets an area where the client radio node is located. That is, by such predetermined receiving time-spatial sweeping pattern, the client radio node knows when a beam of the receiving time-spatial sweeping pattern of the server radio node is targeted to it so that the client radio node does not have to repeatedly transmit the random access preamble when the receiving beam of the server radio node is targeted in other directions. As a consequence the number of repetitions in transmission of random access preambles, small amounts of data and reports from the client radio node side during association or connection setup may be significantly reduced or avoided. This will significantly reduce overhead compared to the receiving beam sweeping in 802.11ad systems. As a consequence of reduced overhead, interference is also decreased.

Therefore, embodiments herein provide an improved method for the server radio node and client radio node with high gain beamforming in the wireless communication network. Embodiments herein also increase and improve the capacity and signal quality of the wireless communication network.

BRIEF DESCRIPTION OF THE DRAWINGS

Examples of embodiments herein are described in more detail with reference to attached drawings in which.

DETAILED DESCRIPTION

Figure 1:
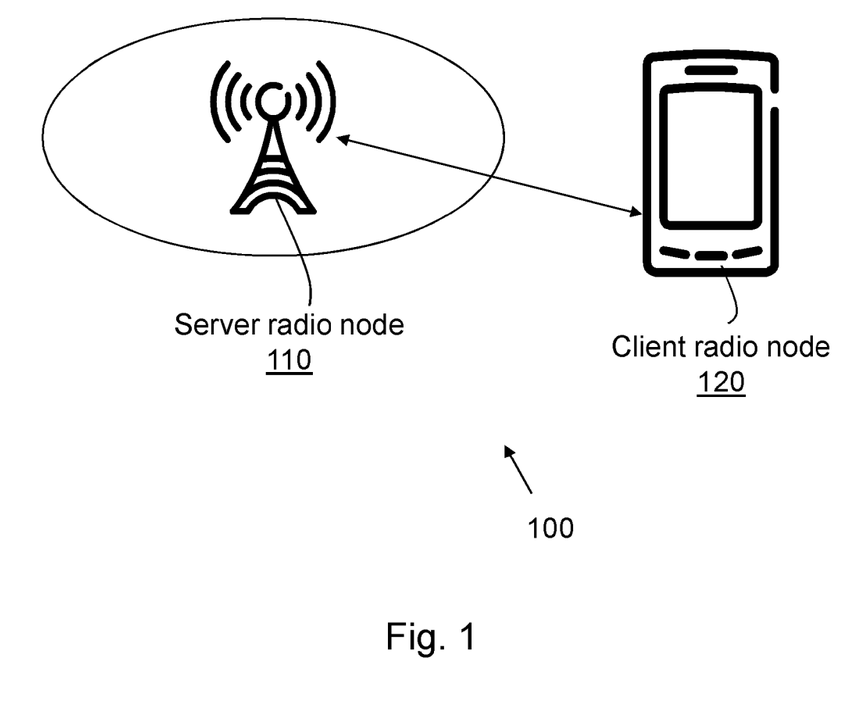
FIG. 1 is a scenario illustrating communication between a server radio node and a client radio node in a wireless communication network.

FIG. 1 depicts an example of a wireless communication network 100 in which embodiments herein may be implemented. The wireless communication network 100 comprises a plurality of network access nodes whereof two, a server radio node 110 and a client radio node 120 are depicted in FIG. 1. The server radio node 110 may be a Node B, a Base Station (BS), an eNB, an eNodeB, an Home Node B, an Home eNode B, an access point or any other network node capable to serve a client radio node in any wireless system or cellular network, such as an LTE network, any $3^{rd}$ Generation Partnership Project (3GPP) cellular network, an MWV network, a Wimax network, a WLAN/Wi-Fi, a WPAN etc. The client radio node 120 may e.g. be a wireless device, a mobile wireless terminal or a wireless terminal, a mobile phone, a computer such as a laptop, a Personal Digital Assistants (PDAs) or a tablet computer, sometimes referred to as a phablet, with wireless capability, a sensor or actuator with wireless capabilities or any other radio network units capable to communicate over a radio link in a wireless communication network. It should be noted that the term client radio node used in this document also covers other wireless devices such as Machine to Machine (M2M) devices, also denoted Machine Type Communication (MTC) devices.

A feature of embodiments herein for a server radio node to receive or monitor random access requests/preambles or any other signals from multiple client radio nodes, is that a receiving time-spatial sweeping pattern is obtained or determined in advance so that it is predefined or predetermined for the server radio node 110 and the client radio node 120 transmits the random access preamble when a beam of the receiving time-spatial sweeping pattern of the server radio node 110 is directed towards an area where the client radio node is located. That is, by such predefined receiving time-spatial sweeping pattern, the client radio node knows when a beam of the receiving time-spatial sweeping pattern of the server radio node is targeted to the client radio node so that the client radio node does not have to repeatedly transmit the random access preamble when the server radio node targets its beam to other directions.

Furthermore, such predefined receiving time-spatial sweeping pattern based beamforming method may also be used to receive other control and data information from the client radio node 120. For instance it may be used for receiving scheduling requests, buffer status reports and small amounts of data, as well as for receiving contention messages, tracking area updates etc. from the client radio node, hereafter referred to as signals transmitted from the client radio node to the server radio node.

Figure 2:
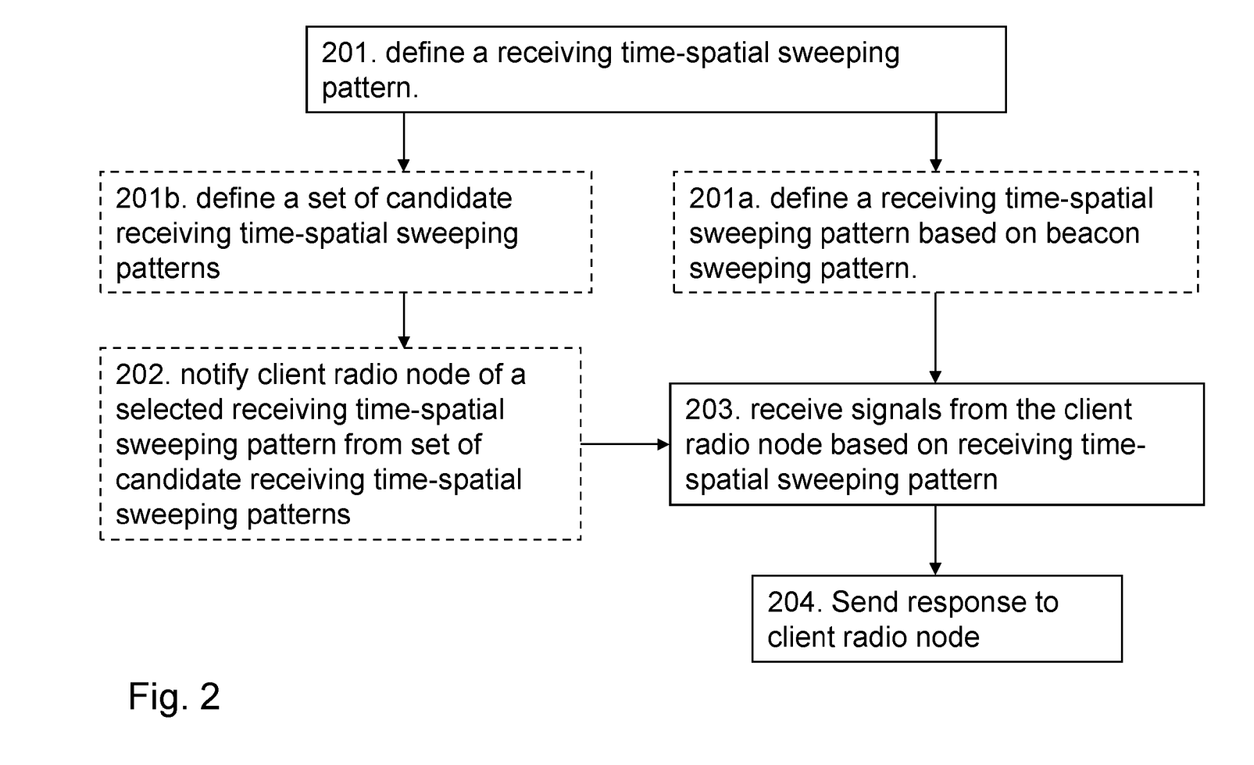
FIG. 2 is a flowchart depicting a method in a server radio node, according to some possible embodiments.

Some possible embodiments of a method performed in a server radio node 110 for receiving signals from a client radio node 120 in a wireless communication network 100, will now be described with reference to FIG. 2. The method comprises the following actions:

Action 201

The server radio node 110 determines a receiving time-spatial sweeping pattern. The server radio node 110 may in some embodiments determine the receiving time-spatial sweeping pattern by receiving or otherwise being configured with the receiving time-spatial sweeping pattern from another node in the network, whereas in other embodiments the determination may be involve the server node 110 defining the receiving time-spatial sweeping pattern using information available at the server radio node 110 or otherwise obtainable by the server radio node 110.

Action 201a

According to one embodiment, the server radio node 110 determines the receiving time-spatial sweeping pattern based on a beacon sweeping pattern. This may be done by determining the receiving time-spatial sweeping pattern with an index offset with respect to an index of a beacon beam of the beacon sweeping pattern. The beacon sweeping may be performed by the server radio node 110 in Beacon Transmission Interval (BTI), where the server radio node 110 may perform Directional Multi-Gigabit (DMG) beacons in different directions for new client radio nodes to join in the wireless communication network 100, i.e. the server radio node broadcasts system information via beacon beams transmitted according to the beacon sweeping pattern.

Figure 3A:
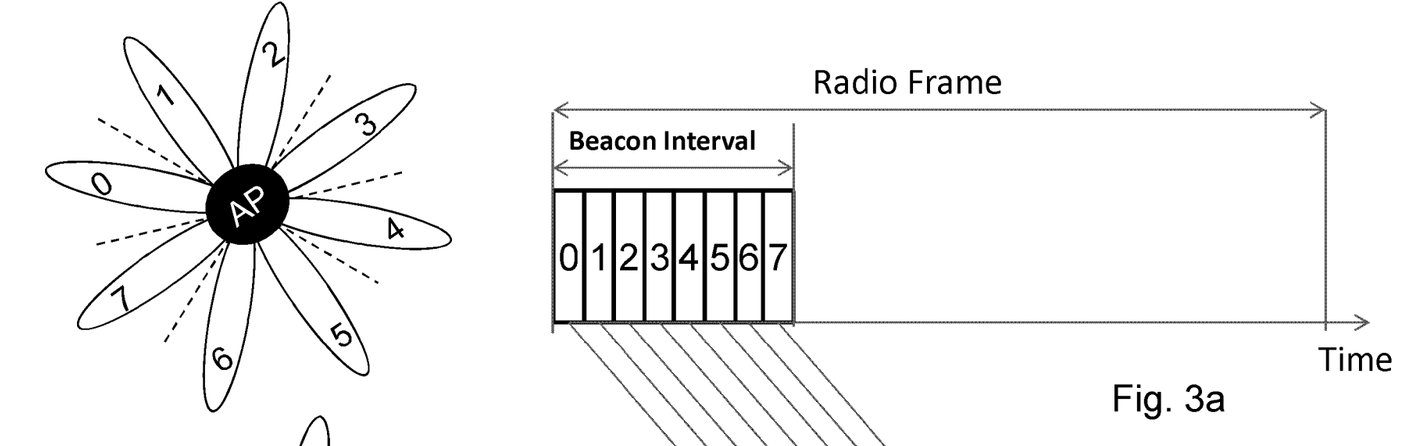
FIG. 3a illustrates an example of a beacon sweeping pattern.
Figure 3B:
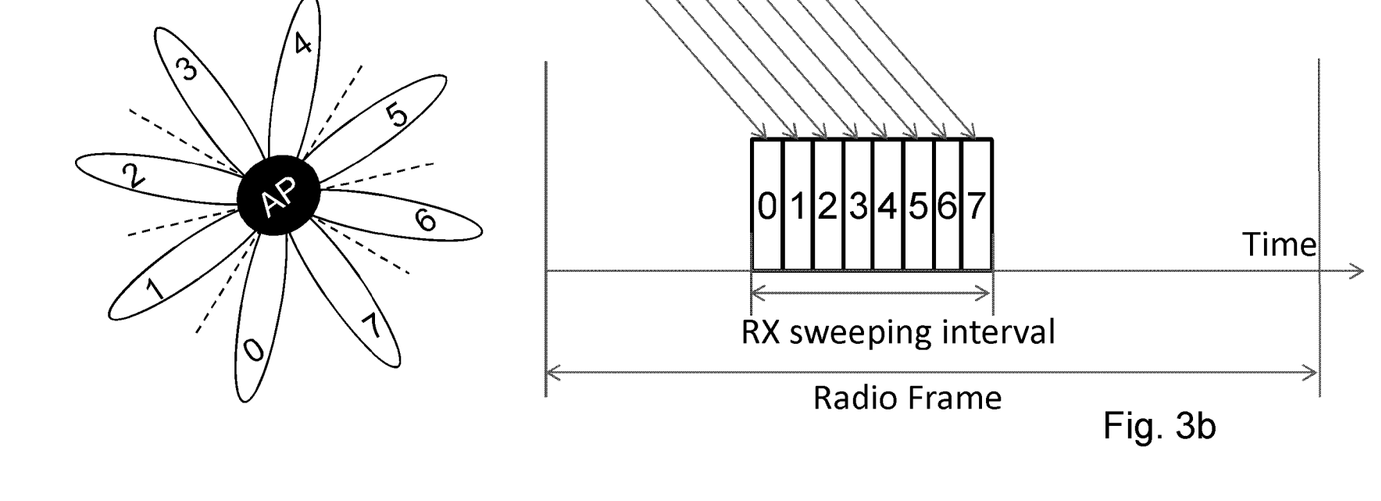
FIG. 3b illustrates an example of a receiving time-spatial sweeping pattern.

FIG. 3 illustrates an example of a receiving time-spatial sweeping pattern with an index offset of 2 with respect to the beacon beam of the beacon sweeping pattern. FIG. 3 illustrates this in two parts, FIG. 3a and FIG. 3b. FIG. 3a shows the beacon sweeping pattern, wherein to the left, beacon beams with index number 0, 1, ... 7 are shown, each beacon beam targeting a different direction, and to the right, transmission time for beacon beams with index number 0, 1 ... 7 are shown, each beacon beam transmitted at a different time. FIG. 3b shows the receiving time-spatial sweeping pattern, and it can be seen that receiving beam 2 in the receiving time-spatial sweeping pattern corresponds to beacon beam 0 in the beacon sweeping pattern, i.e. receiving beam 2 in the receiving time-spatial sweeping pattern has an index offset of 2 with respect to the index of the beacon beam 0. Such mapping between the beacon sweeping pattern and the receiving time-spatial sweeping pattern, i.e. the above index offset, may be predefined such that no signalling is needed from the server radio node 110 to inform the client radio node 120 of the index offset. Alternatively, the index offset may be indicated to the client radio node 120 via broadcast or dedicated signalling.

Action 201b

According to another embodiment, the server radio node 110 determines a set of candidate receiving time-spatial sweeping patterns. In this way, the server radio node 110 may select a receiving time-spatial sweeping pattern from the set of candidate receiving time-spatial sweeping patterns.

Action 202

According to some embodiments, the server radio node 110 defines or determines, in the above Action 201b a set of candidate receiving time-spatial sweeping patterns, the server radio node 110 may in some embodiments further take action to notify the client radio node 120 of a selected receiving time-spatial sweeping pattern from the set of candidate receiving time-spatial sweeping patterns.

According to one embodiment, the server radio node sends an index of a selected receiving time-spatial sweeping pattern to the client radio node 120. This may be done via broadcast or dedicated signalling.

Action 203

The server radio node 110 receives at least one signal from the client radio node 120 based on the receiving time-spatial sweeping pattern. The at least one signal is transmitted by the client radio node 120 according to a transmitting time-spatial pattern determined by the client radio node 120 based on a predefined rule. The at least one signal from the client radio node 120 is thus detected and/or received by the server radio node 110 using the receiving time-spatial sweeping pattern.

According to one embodiment, the predefined rule is based on the receiving time-spatial sweeping pattern of the server radio node 110. Since the receiving time-spatial sweeping pattern of the server radio node is pre-defined or pre-determined as in Action 201, the transmitting time-spatial pattern of the client radio node 120 may be determined based on the receiving time-spatial sweeping pattern of the server radio node 110. Therefore the time-spatial relationship between the receiving time-spatial sweeping pattern of the server radio node and the transmitting time-spatial pattern of the client radio node 120 is known to the client radio node 120.

According to one embodiment, the predefined rule is based on a timing when a beam of the receiving time-spatial sweeping pattern of the server radio node is directed towards an area where the client radio node 120 is located. In this way, whenever the client radio node 120 transmits signals according to the determined transmitting time-spatial pattern of the client radio node 120, the beam of the receiving time-spatial sweeping pattern of the server radio node 110 is targeted in the client radio node's direction.

According to one embodiment, the predefined rule is based on indicating, by the server radio node 110, the transmitting time-spatial pattern of the client radio node 120 for each beam of the transmitting time-spatial pattern to the client radio node 120 over a corresponding beacon beam of a beacon sweeping pattern. In other words, information on the transmitting time-spatial pattern is indicated to the client radio node 120 by the server radio node 110 by indicating information for each beam of the transmitting time-spatial pattern over the corresponding beacon beam of the beacon sweeping pattern. In this way, the client node 120 is able to determine when to transmit the RA preamble or signal by one or more of the strongest beacon beams it detects. The indication is beam-specific, for example, in one beacon beam of the beacon sweeping pattern, the server radio node 110 can only indicate the corresponding beam of the transmitting time-spatial pattern for the client radio node 120.

Action 204

According some embodiments, the server radio node 110 sends a response to the client radio node 120 when the at least one signal is received and detected so that the client radio node 120 doesn't need to re-send the signal.

Figure 4:
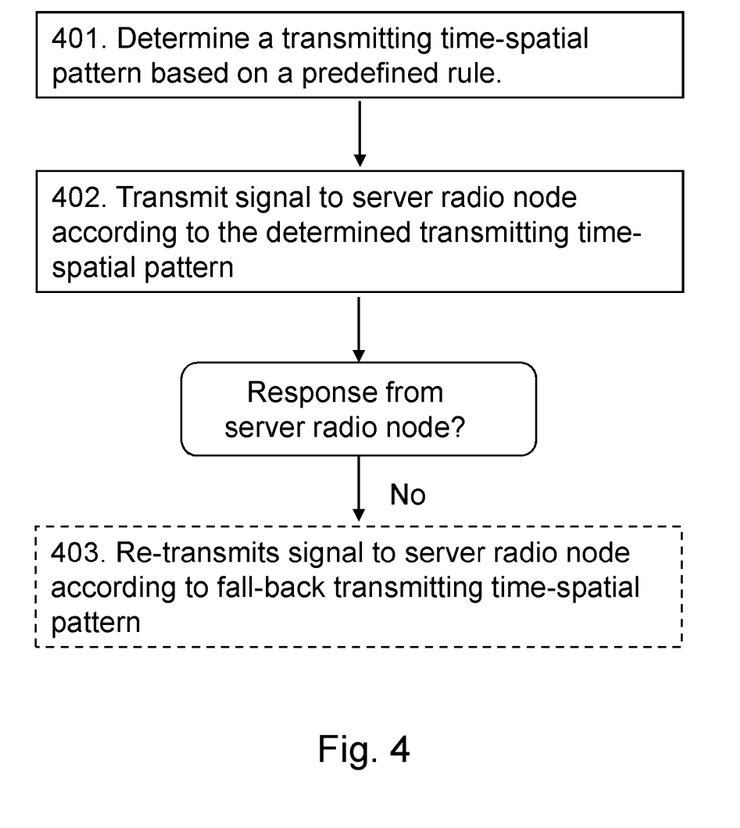
FIG. 4 is a flowchart depicting a method in a client radio node, according to further possible embodiments.

Some possible embodiments of a method performed in a client radio node 120 for transmitting signals to a server radio node 110 in a wireless communication network 100, will now be described with reference to FIG. 4. The method in this example comprises the following actions:

Action 401

The client radio node 120 determines a transmitting time-spatial pattern based on a predefined rule.

The predefined rule may be realized according to any of the following embodiments:

According to one embodiment, the client radio node 120 determines the transmitting time-spatial pattern based on a receiving time-spatial sweeping pattern of the server radio node 110.

According to one embodiment, the client radio node 120 determines the transmitting time-spatial pattern based on information indicated to the client radio node 120 by the server radio node 110. The server radio node 110 may indicate to the client radio node 120 information on the transmitting time-spatial pattern of the client radio node 120 for each beam of the transmitting time-spatial pattern over a corresponding beacon beam of a beacon sweeping pattern.

According to one embodiment, the client radio node 120 determines an index of a preferred beacon beam from a beacon sweeping pattern. The preferred beacon beam may be a best beacon beam which has the strongest signal strength that the client radio node 120 detects. The client node 120 then determines the transmitting time-spatial pattern based on the index of the best beacon beam.

According to one embodiment, the client radio node 120 determines the transmitting time-spatial pattern based on a timing when a beam of the receiving time-spatial sweeping pattern of the server radio node 110 is directed towards an area where the client radio node 110 is located. In a further embodiment, the client radio node 120 determines a number of repeated transmissions in the transmitting time-spatial pattern for the client radio node 120. This means that the client node 120 transmits the at least one signal according to the determined transmitting time-spatial pattern at a certain time and repeats the transmission a determined number of times.

Action 402

The client radio node 120 transmits at least one signal to the server radio node 110 according to the determined transmitting time-spatial pattern.

According to one embodiment, the client radio node 120 transmits the at least one signal to the server radio node 110 during a time when a beam of the receiving time-spatial sweeping pattern of the server radio node 110 is directed towards an area where the client radio node (120) is located.

According to one embodiment, the client radio node 120 transmits the at least one signal repeatedly at a determined beam occurrence of a receiving time-spatial sweeping pattern of the server node 110 and at beam occurrences which are spatially adjacent to the determined beam occurrence. The beam of the determined beam occurrence of the receiving time-spatial sweeping pattern of the server radio node 110 may have an index offset with respect to an index of a preferred beacon beam, and the beams of the beam occurrences which are spatially adjacent to the determined beam occurrence then have an index offset of +1 and an index offset of −1 respectively relative to the index offset of the beam of the determined beam occurrence. This will be further explained by examples in the following section.

Action 403

For example, in case there is a mismatch between receiving direction and transmitting direction, i.e. between a receiving beam and a transmitting beam of the server radio node 110, the client radio node 120 may not get any response from the server node 110 for the at least one signal transmitted using the determined time-spatial transmitting pattern. The missing response may be a result of the mismatch, as the server radio node 110 may not be able to detect the at least one signal sent from the client radio node 120 using the determined time-spatial transmitting pattern. The client radio 120 may then in some embodiments re-transmit the at least one signal to the server radio node 110 according to a fall-back transmitting time-spatial pattern.

According to one embodiment, a number of repeated transmissions of the at least one signal in the fall-back time-spatial transmitting pattern is greater than the number of repeated transmissions of the at least one signal in the determined transmitting time-spatial pattern.

According to one embodiment, the fall-back time-spatial transmitting pattern is configured by the server radio node 110 based on a spatial mismatch between a receiving beam and a transmitting beam of the server radio node 110. The configuration may in some embodiments be made via broadcast.

This fallback procedure and the fall-back transmitting time-spatial pattern may be predefined.

According to embodiments herein, the at least one signal transmitted from the client radio node 120 to the server radio node 110 may be one or more of random access preambles, control or data information, scheduling requests, buffer status reports, contention messages and tracking area update information etc.

To further explain some of the embodiments described above, examples will now be described with reference to FIG. 3, taking as an example that the at least one signal transmitted by the client radio node is a random access preamble. As shown in FIG. 3, the receiving time-spatial sweeping pattern has an index offset of 2 with respect to the index of the beacon beam. The index offset may be predefined or predetermined so that the client radio node 120 knows it in advance or the index offset may be indicated to the client radio node 120 via broadcast or dedicated signalling. If the client radio node 120 determines that the preferred or "best" beacon beam is Beacon beam 3, the client radio node 120 is then able to determine that the receiving beam of the server radio node 110 which is targeted to its location will be the receiving beam of the 5-th receiving beam occurrence during the receiving beam sweeping for the random access preamble detection. As a consequence, the client radio node 120 may transmit the random access preamble only at the fifth receiving beam occurrence. This is illustrated via the mapping between the left and middle columns in Table 1. Table 1 is a mapping table between the index of the best beacon beam and the index of the transmitting beam in the transmitting time-spatial pattern of the client radio node 120, where the left column shows the best beacon beam index, the middle column shows the index of the best Uplink (UL) transmission (TX) beam only in the transmitting time-spatial pattern of the client radio node 120, and the right column shows the index of the best UL TX beam (numbers highlighted in bold) plus the spatially adjacent UL TX beams in the transmitting time-spatial pattern. In this way, the client radio node 120 transmits the random access preamble only once when the receiving beam of the server radio node 110 is directly targeted to the client radio node 120. Thus, only a single transmission of the random access preamble is performed instead of 8 repetitions as in 802.11 AD, i.e. ⅞ overhead reduction is achieved.

In another example of embodiments herein, the client radio node 120 may repeatedly transmit the at least one signal, e.g. the random access preamble, at the determined receiving beam occurrence and at receiving beam occurrences which are spatially adjacent to the determined receiving beam occurrence. This could reduce the misdetection ratio of the random access preamble when there is a direction deviation between the beacon beam and the corresponding determined receiving beam for the random access preamble detection. According to the receiving time-spatial sweeping pattern illustrated in FIG. 3, when the client radio node 120 determines that the best beacon beam is Beacon beam 3, as stated above, the client radio node 120 is able to determine that the receiving beam of the server radio node 110 which is targeted to its location will be the beam of the 5-th receiving beam occurrence. Then the receiving beams which are spatially adjacent to the determined receiving beam of the 5-th receiving beam occurrence will be the receiving beams of the 4-th and 6-th receiving beam occurrences, i.e. the spatially adjacent receiving beams have an index offset of +1 and an index offset of −1 respectively relative to the index offset of the determined receiving beam. As a consequence, the client radio node 120 may repeatedly transmit the random access preamble during the 4-6-th receiving beam occurrences. This is illustrated via the mapping between the left and right column in Table 1. In this way, there are 3 repeated random access preamble transmissions instead of 8 repetitions as in 802.11 AD, i.e. ⅝ overhead reduction is achieved.

TABLE 1 mapping between index of the best beacon and time-spatial transmitting pattern of the RA preamble

| Best beacon beam index | index of the best Uplink (UL) transmission (TX) beam | Index of best UL TX beam (bold) and index of the spatially adjacent UL TX beams |
| --- | --- | --- |
| 0 | 2 | 1, 2, 3 |
| 1 | 3 | 2, 3, 4 |
| 2 | 4 | 3, 4, 5 |
| 3 | 5 | 4, 5, 6 |
| 4 | 6 | 5, 6, 7 |
| 5 | 7 | 6, 7, 0 |
| 6 | 0 | 7, 0, 1 |
| 7 | 1 | 0, 1, 2 |

Figure 5:
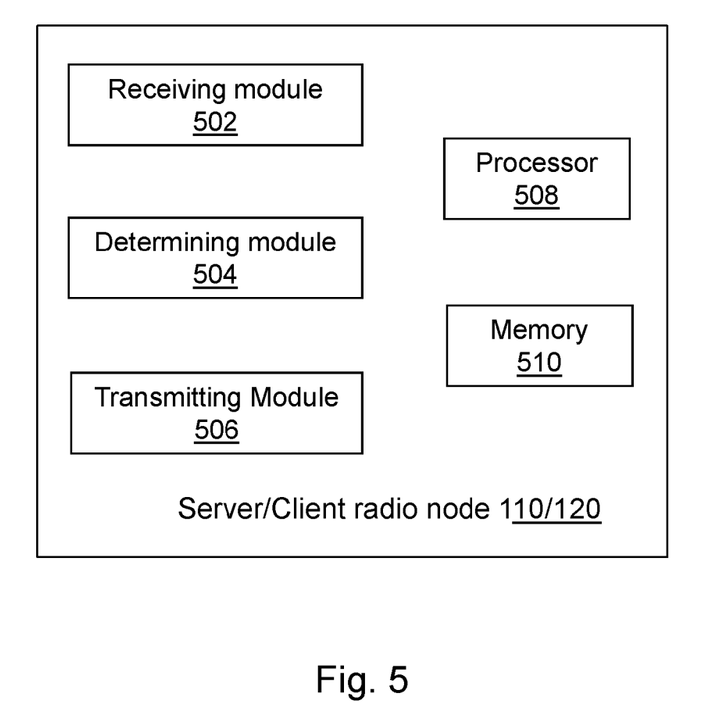
FIG. 5 is a block diagram illustrating a server/client radio node, according to further possible embodiments.

To perform the methods actions in the server radio node 110 and the client radio node 120 for receiving and transmitting signals in the wireless communication network 100 described above in relation to FIGS. 2 and 4, the server radio node 110 and the client radio node 120 may comprise circuits or modules as depicted in FIG. 5. The server radio node 110 and the client radio node 120 may basically have the same structure and each comprises similar circuits, units or modules, such as a receiving module 502, a determining module 504, a transmitting module 506, a processor 508 and a memory 510, where each module may be configured differently in dependence of the specific functions to be performed.

The server radio node 110 is configured to, e.g. by means of a determining module 504, determine a receiving time-spatial sweeping pattern for the server radio node (110). The server radio node 110 is further configured to, e.g. by means of a receiving module 502, receive at least one signal from the client radio node 120 based on the receiving time-spatial sweeping pattern. The at least one signal is transmitted by the client radio node 120 according to a transmitting time-spatial pattern determined by the client radio node 120 based on a predefined rule. The server radio node 110 is thus configured to detect and/or receive the at least one signal from the client radio node 120 using the receiving time-spatial sweeping pattern. The server radio node 110 is further configured to, e.g. by means of a transmitting module 506, send a response to the client radio node 120.

The client radio node 120 is configured to, e.g. by means of a determining module 504, determine a transmitting time-spatial pattern based on a predefined rule. The client radio node 120 is further configured to, e.g. by means of a transmitting module 506, transmit the at least one signal to the server radio node 110 according to the determined transmitting time-spatial pattern.

Figure 6:
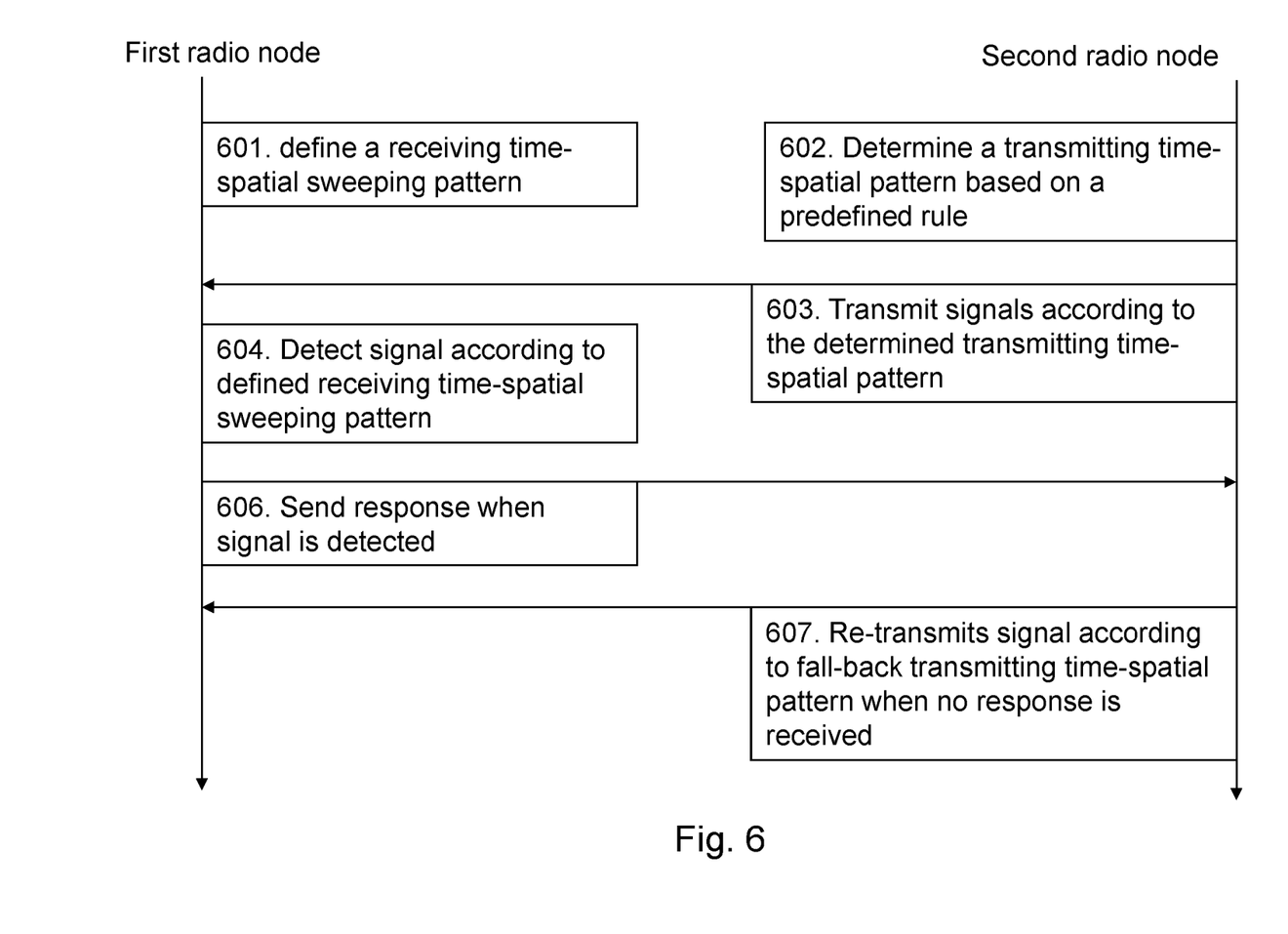
FIG. 6 is a flowchart depicting a method in a wireless communication network, according to further possible embodiments.

Example of embodiments of a method in a wireless communication network 100 for receiving and transmitting signals between a first radio node 110 and a second radio node 120 will now be described with reference to FIG. 6. The first node 110 and the second node 120 are access nodes, and each node may be a server radio node or a client radio node. The method in this example comprises the following actions:

Action 601

Assuming that the first radio node 110 operates as a server radio node for receiving the signals, a receiving time-spatial sweeping pattern is defined or determined for the first radio node 110. The receiving time-spatial sweeping pattern may be determined at the first radio node 110.

Action 602

Assuming that the second radio node 120 operates as a client radio node for transmitting the signals, a transmitting time-spatial pattern is determined based on a predefined rule for the second radio node 120. The transmitting time-spatial pattern is determined at the second radio node 120.

Action 603

The second radio node 120 transmits a signal according to the determined transmitting time-spatial pattern.

Action 604

The first radio node 110 detects the signal according to the receiving time-spatial sweeping pattern of the first radio node 110.

Action 605

The first radio node 110 sends a response to the second radio node 120 when the signal is detected.

Action 606

When no response is received from the first radio node 110, the second radio node 120 re-transmits the signal according to a fall-back transmitting time-spatial pattern.

Figure 7:
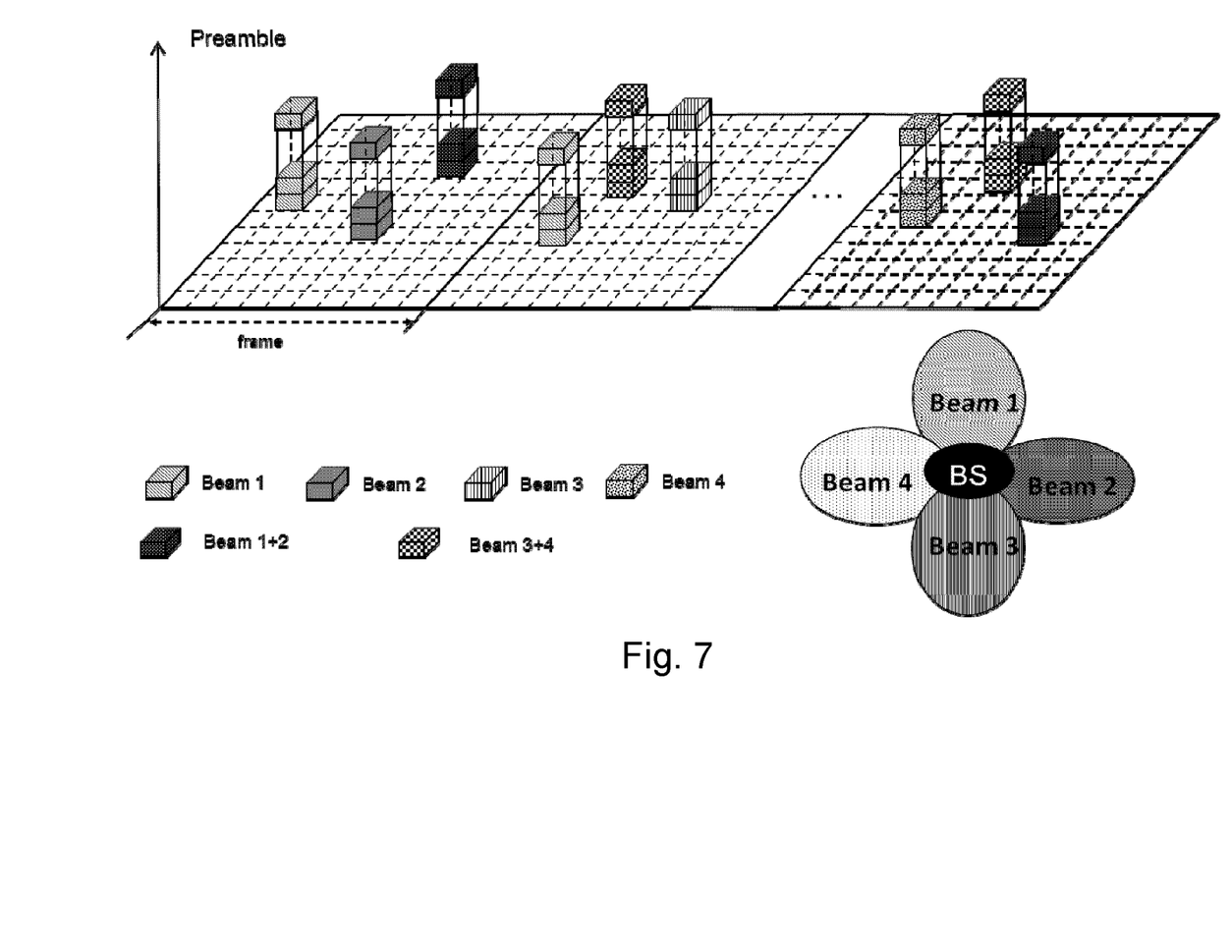
FIG. 7 shows an example of beam-specific random access configuration for a server radio node.

As an example, the embodiments herein may be implemented in a next generation or 5G LTE wireless communication system, which operates at high frequencies of 10-30 GHz. FIG. 7 shows an example of defining or determining a receiving time-spatial sweeping pattern for the BS, i.e. the server radio node 110. The top part of FIG. 7 shows the determined receiving time-spatial sweeping pattern as random access resource block configurations. The random access resource blocks are resource blocks where the server radio node 110 expects to receive preambles from the client radio nodes performing random access. Beam 1-4, shown in the bottom right part of FIG. 7, is the receiving beam Identity (ID), e.g. direction, from the BS side. The specific random access resource block is configured for each beam (e.g. beam 1) or beam groups (e.g. beam 1+2). Particularly, specific Physical Random Access Channel (PRACH) resource block (continual or non-continual) can be configured for different beams. For Time & Frequency Division Multiplexing (TDM/FDM) system, a certain resource block is configured only for a certain beam's usage as FIG. 7 shows.

This receiving time-spatial sweeping pattern is known to both the client radio node and the server radio node. From the client radio node side, it knows which beam direction the server radio node receives its signal from. Then the client radio node sends random access preamble in the resource block with a beam ID corresponding to the receiving beam ID. From the server radio node side, it knows which receive beam direction is used for different random access resource blocks.

Figure 8:
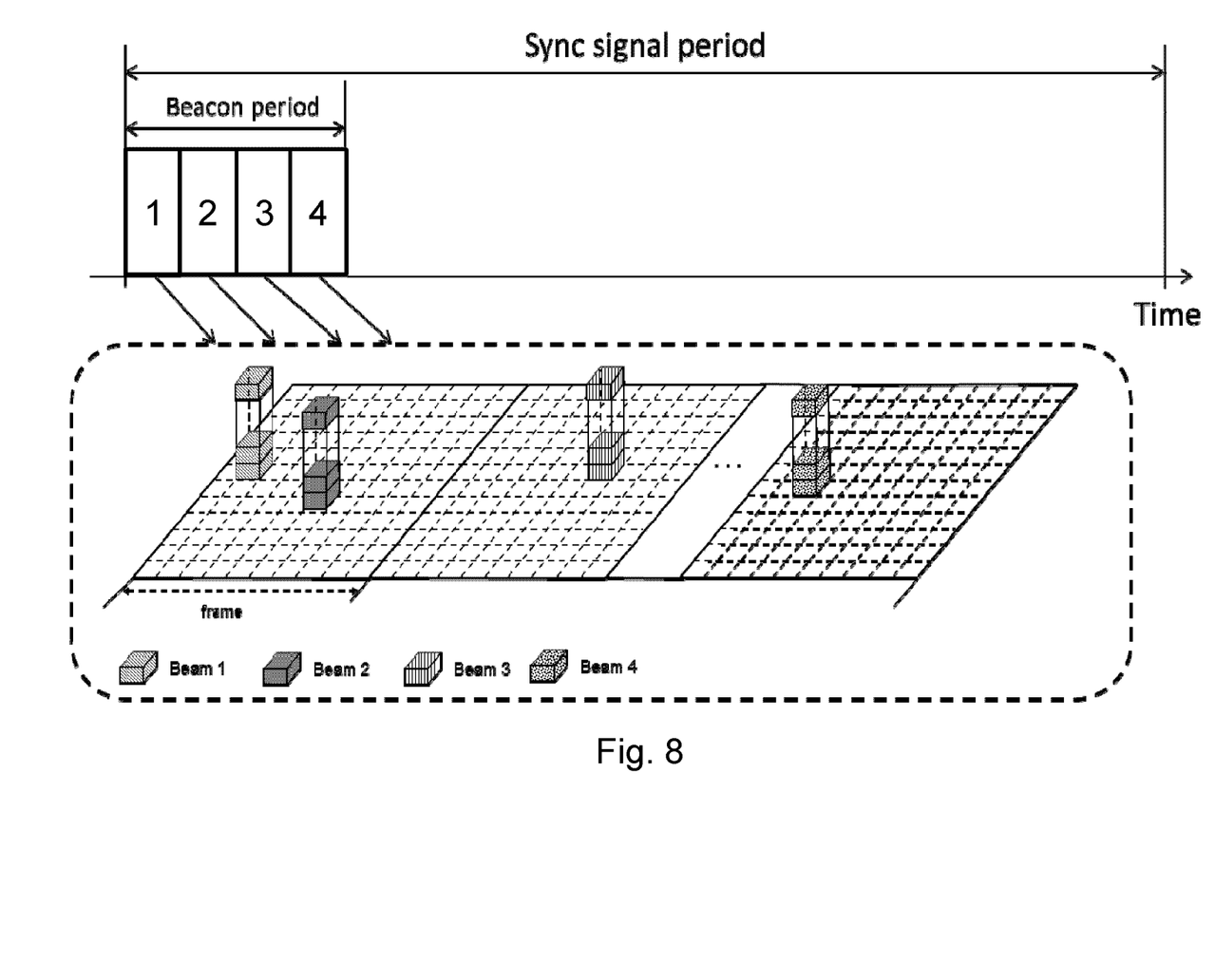
FIG. 8 Illustrates an example of beacon information on random access configuration.
Figure 9:
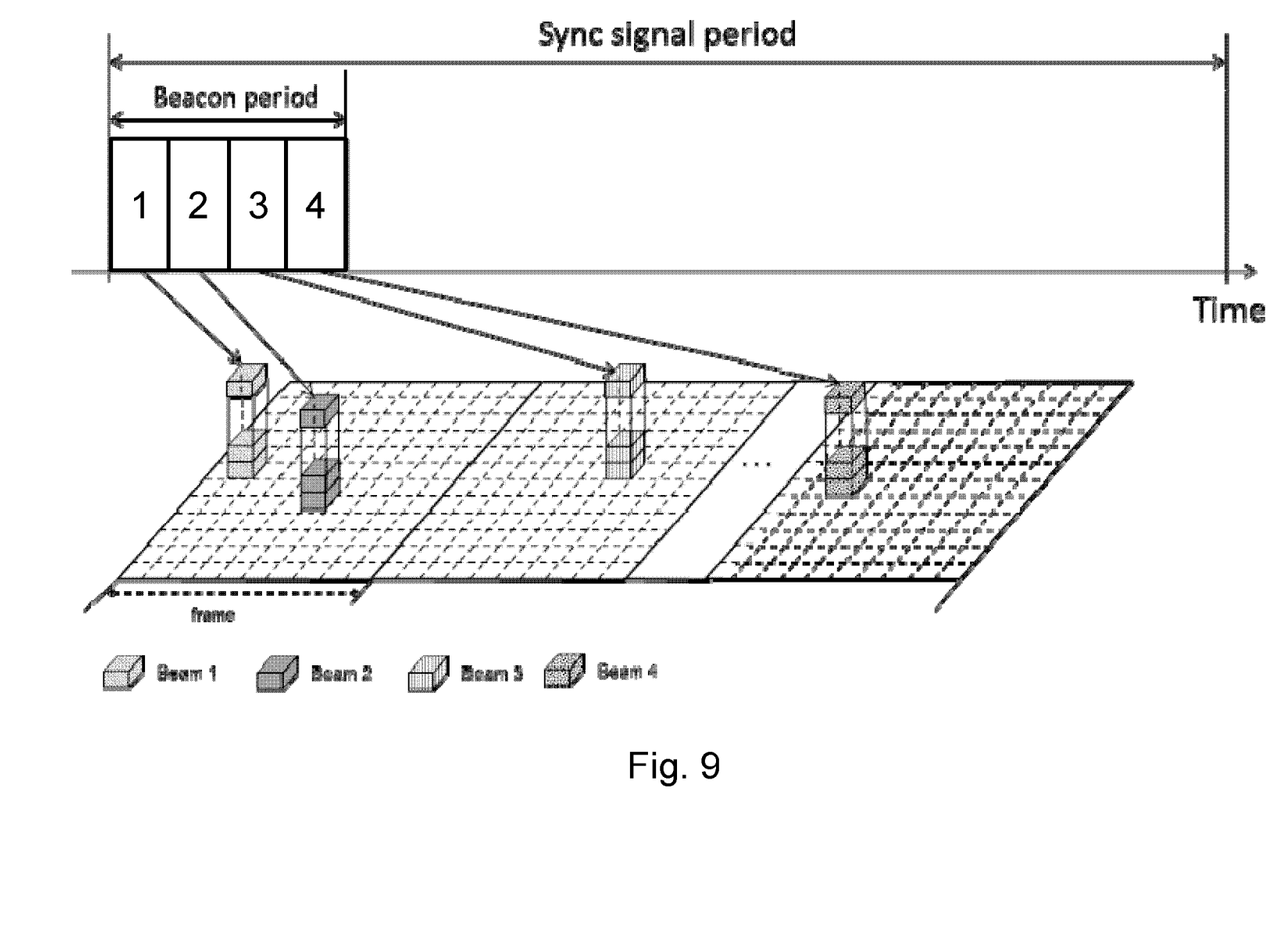
FIG. 9 Illustrates an example of beam-specific beacon information on random access configuration.

As an example for the embodiments of determining a transmitting time-spatial pattern based on information indicated to the client radio node 120 by the server radio node 110 in the 5G LTE system, the BS may transmit the random access resource block configurations for all receiving beams, in each beacon beam of the beacon sweeping pattern, as illustrated in FIG. 8. Alternatively, the BS transmit only the random access resource block configuration for a certain receiving beam in the corresponding beacon beam of the beacon sweeping pattern, as illustrated in FIG. 9, i.e. the random access resource block configuration for receiving beam i is indicated and transmitted in the beacon beam i.

As described above, the principle of the embodiments herein is that the server radio node 110 detects and/or receives the at least one signal, e.g. an RA preamble, using the predefined or predetermined receiving time-spatial sweeping pattern, and the client radio node 120 transmits the RA preamble according to the determined transmitting time-spatial pattern. The transmitting time-spatial pattern of the client radio node 120 is determined either based on the receiving time-spatial sweeping pattern, or based on a timing when a beam of the receiving time-spatial sweeping pattern of the server radio node is directed towards an area where the client radio node is located, or based on information indicated to the client radio node, e.g. information of a transmitting time-spatial pattern of the client radio node for each beam is indicated to the client radio node over corresponding beacon beam of a beacon sweeping pattern by the server radio node 110. By such a pattern definition, the client radio node 120 knows when one or more beams of the receiving time-spatial sweeping pattern of the server radio node 110 are targeted to an area where it is located, and the client radio node 120 may transmit the at least one signal, e.g. the RA preamble, only during these beam occurrences. As a consequence, the number of repeated signals or RA preambles transmitted from the client radio node 120 during association or connection setup can be significantly reduced or avoided. Interference caused by these repeated transmissions is also reduced. Therefore, the throughput and signal quality of the wireless communication network is increased and improved.

Those skilled in the art will also appreciate that the receiving module 502, the determining module 504 and the transmitting module 506 described above for the server radio node 110 or for the client radio node 120, may be referred to as one circuit or one module, a combination of analog and digital circuits, one or more processors configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for the server radio node 110 and/or client radio node 120 in the wireless communication network 100 may be implemented through one or more processors, such as the processor 508 in the server/client radio node, together with computer program code for performing the functions and actions of the embodiments herein. The program code mentioned above may also be provided as a computer program product, for instance in the form of a data carrier carrying computer program code for performing the embodiments herein when being loaded into the server/client radio node 110/120. One such carrier may be in the form of a CD ROM disc. It is however feasible with other data carriers such as a memory stick. The computer program code may furthermore be provided as pure program code on a server and downloaded to the server/client radio node 110/120.

The memory 510 in the server/client radio node 110/120 may comprise one or more memory units and may be arranged to be used to store received information, measurements, data, configurations to perform the methods herein when being executed in the server/client radio node 110/120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method, performed by a server radio node, for receiving signals from a client radio node in a wireless communication network, the method comprising:
   determining a receiving time-spatial sweeping pattern for the server radio node, based on an index of a beacon beam in a beacon sweeping pattern used by the server radio node to transmit beacon beams; and
   receiving at least one signal from the client radio node according to the receiving time-spatial sweeping pattern, the at least one signal being transmitted by the client radio node according to a transmitting time-spatial pattern determined by the client radio node based on a predefined rule, the predefined rule defining a timing at which the client radio node transmits said signal to the server radio node, based on the index.

2. The method of claim 1, wherein determining the receiving time spatial sweeping pattern comprises determining the receiving time spatial sweeping pattern with an index offset with respect to the index of the beacon beam of the beacon sweeping pattern.

3. The method of claim 2, wherein the index offset is predetermined such that no signaling is needed from the server radio node to inform the client radio node of the index offset.

4. The method of claim 2, wherein the index offset is indicated to the client radio node via broadcast or dedicated signaling.

5. The method of claim 1, wherein the predefined rule is based on indicating, by the server radio node, the transmitting time-spatial pattern of the client radio node for each beam of the transmitting time-spatial pattern to the client radio node over a corresponding beacon beam of a beacon sweeping pattern for a beacon transmitted to the client radio node.

6. The method of claim 1, wherein determining a receiving time-spatial sweeping pattern for the server radio node comprises:
determining a set of candidate receiving time-spatial sweeping patterns.

7. The method of claim 6, further comprising notifying the client radio node of a selected receiving time-spatial sweeping pattern from the set of candidate receiving time-spatial sweeping patterns.

8. The method of claim 7, wherein notifying the client radio node of a selected receiving time-spatial sweeping pattern comprises sending an index of the selected receiving time-spatial sweeping pattern to the client radio node.

9. The method of claim 1, wherein the predefined rule is based on the receiving time-spatial sweeping pattern of the server radio node.

10. The method of claim 1, wherein the predefined rule is based on a timing when a beam of the receiving time-spatial sweeping pattern of the server radio node is directed towards an area where the client radio node is located.

11. The method of claim 1, wherein the at least one signal comprises a random access preamble.

12. A method, performed by a client radio node, for transmitting signals to a server radio node in a wireless communication network, the method comprising:
determining an index of a beacon beam in a beacon sweeping pattern used by the server radio node;
determining a transmitting time-spatial pattern for the client radio node, based on a predefined rule, the predefined rule defining a timing at which the client radio node transmits said signal to the server radio node in accordance with said index of the beacon beam; and
transmitting at least one signal to the server radio node according to the determined transmitting time-spatial pattern.

13. The method of claim 12, wherein the predefined rule is based on a receiving time-spatial sweeping pattern of the server radio node.

14. The method of claim 12, wherein the predefined rule is based on information indicated to the client radio node by the server radio node.

15. The method of claim 14, wherein the information indicated to the client radio node by the server radio node comprises information on the transmitting time-spatial pattern of the client radio node for each beam of the transmitting time-spatial pattern.

16. The method of claim 12, wherein the predefined rule is based on an index of a preferred beacon beam determined by the client radio node from the beacon sweeping pattern.

17. The method of claim 12, wherein the predefined rule is based on a timing when a beam of a receiving time-spatial sweeping pattern of the server radio node is directed towards an area where the client radio node is located.

18. The method of claim 12, wherein determining the transmitting time-spatial pattern based on the predefined rule further comprises determining a number of repeated transmissions in the transmitting time-spatial pattern for the client radio node.

19. The method of claim 12, wherein transmitting at least one signal to the server radio node according to the determined transmitting time-spatial pattern comprises transmitting the at least one signal to the server radio node during a time when a beam of a receiving time-spatial sweeping pattern of the server radio node is directed towards an area where the client radio node is located.

20. The method of claim 12, wherein transmitting at least one signal to the server radio node according to the determined transmitting time-spatial pattern comprises transmitting the at least one signal repeatedly at a determined beam occurrence of a receiving time-spatial sweeping pattern of the server node and at beam occurrences which are spatially adjacent to the determined beam occurrence.

21. The method of claim 20, wherein the beam of the determined beam occurrence of the receiving time-spatial sweeping pattern of the server radio node has an index offset with respect to an index of a preferred beacon beam, and the beams of the beam occurrences which are spatially adjacent to the determined beam occurrence have an index offset +1 and an index offset of −1 respectively relative to the index offset of the beam of the determined beam occurrence.

22. The method of claim 12, further comprising re-transmitting the at least one signal to the server radio node according to a fall-back transmitting time-spatial pattern when no response is received from the server radio node.

23. The method of claim 22, wherein a number of repeated transmissions in the fall-back time-spatial transmitting pattern is more than a number of repeated transmissions in the determined transmitting time-spatial pattern.

24. The method of claim 22, wherein the fall-back time-spatial transmitting pattern is configured by the server radio node based on a spatial mismatch between a receiving beam and a transmitting beam of the server radio node.

25. The method of claim 12, wherein the at least one signal transmitted from the client radio node to the server radio node comprises one or more of random access preambles, control or data information, scheduling requests, buffer status reports, contention messages, tracking area update information.

26. The method of claim 12, wherein the at least one signal comprises a random access preamble.

27. A server radio node for receiving signals from a client radio node in a wireless communication network, wherein the server radio node comprises a transmitter, a receiver, a processor, and memory, wherein the memory comprises instructions configured for execution by the processor, the instructions being such that the server radio node is thereby configured to:
determine a receiving time-spatial sweeping pattern for the server radio node, based on an index of a beacon beam in a beacon sweeping pattern used by the server node to transmit beacon beams; and
receive at least one signal from the client radio node according to the receiving time-spatial sweeping pattern, the at least one signal being transmitted by the client radio node according to a transmitting time-spatial pattern determined by the client radio node based on a predefined rule, the predefined rule defining a timing at which the client radio node transmits said signal to the server radio node, based on the index.

28. The server radio node of claim 27, wherein the instructions are such that the server radio node is configured to determine the receiving time spatial sweeping pattern with an index offset with respect to the index of the beacon beam of the beacon sweeping pattern.

29. The server radio node of claim 28, wherein the index offset is predefined such that no signaling is needed from the server radio node to inform the client radio node of the index offset.

30. The server radio node of claim 28, wherein the instructions are such that the server radio node is further configured to indicate the index offset to the client radio node via broadcast or dedicated signaling.

31. The server radio node of claim 27, wherein the instructions are such that the server radio node is further configured to determine the receiving time-spatial sweeping pattern by defining a set of candidate receiving time-spatial sweeping patterns.

32. The server radio node of claim 31, wherein the instructions are such that the server radio node is further configured to notify the client radio node of a selected receiving time-spatial sweeping pattern from the set of candidate receiving time-spatial sweeping patterns.

33. The server radio node of claim 32, wherein the instructions are such that the server radio node is further configured to notify the client radio node of the selected receiving time-spatial sweeping pattern by sending an index of the selected receiving time-spatial sweeping pattern to the client radio node.

34. The server radio node of claim 27, wherein the at least one signal comprises a random access preamble.

35. A client radio node for transmitting signals to a server radio node in a wireless communication network, wherein the client radio node comprises a transmitter, a receiver, a processor, and memory, wherein the memory comprises instructions configured for execution by the processor, the instructions being such that the client radio node is thereby configured to:
 determine an index of a beacon beam in a beacon sweeping pattern used by the server radio node;
 determine a transmitting time-spatial pattern for the client radio node, based on a predefined rule, the predefined rule defining a timing at which the client radio node transmits said signal to the server radio node in accordance with said index of the beacon beam; and
 transmit at least one signal to the server radio node according to the determined transmitting time-spatial pattern.

36. The client radio node of claim 35, wherein the predefined rule is based on a receiving time-spatial sweeping pattern of the server radio node.

37. The client radio node of claim 35, wherein the predefined rule is based on information indicated to the client radio node by the server radio node.

38. The client radio node of claim 37, wherein the information indicated to the client radio node by the server radio node comprises information on the transmitting time-spatial pattern of the client radio node for each beam of the transmitting time-spatial pattern.

39. The client radio node of claim 35, wherein the predefined rule is based on an index of a preferred beacon beam determined by the client radio node from the beacon sweeping pattern.

40. The client radio node of claim 35, wherein the predefined rule is based on a timing when a beam of a receiving time-spatial sweeping pattern of the server radio node is directed towards an area where the client radio node is located.

41. The client radio node of claim 35, wherein the instructions are such that the client radio node is further configured to determine a number of repeated transmissions in the transmitting time-spatial pattern for the client radio node.

42. The client radio node of claim 35, wherein the instructions are such that the client radio node is further configured to transmit the at least one signal to the server radio node during a time when a beam of a receiving time-spatial sweeping pattern of the server radio node is directed towards an area where the client radio node is located.

43. The client radio node of claim 35, wherein the instructions are such that the client radio node is further configured to transmit the at least one signal repeatedly at a determined beam occurrence of a receiving time-spatial sweeping pattern of the server node and at beam occurrences which are spatially adjacent to the determined beam occurrence.

44. The client radio node of claim 43, wherein the beam of the determined beam occurrence of the receiving time-spatial sweeping pattern of the server radio node has an index offset with respect to an index of a preferred beacon beam, and the beams of the beam occurrences which are spatially adjacent to the determined beam occurrence have an index offset of +1 and an index offset of −1 respectively relative to the index offset of the beam of the determined beam occurrence.

45. The client radio node of claim 35, wherein the instructions are such that the client radio node is further configured to re-transmit the at least one signal to the server radio node according to a fall-back transmitting time-spatial pattern when no response is received from the server radio node.

46. The client radio node of claim 45, wherein a number of repeated transmissions in the fall-back time-spatial transmitting pattern is more than a number of repeated transmissions in the determined transmitting time-spatial pattern.

47. The client radio node of claim 45, wherein the fall-back time-spatial transmitting pattern is configured by the server radio node based on a spatial mismatch between a receiving beam and a transmitting beam of the server radio node.

48. The client radio node of claim 35, wherein the at least one signal comprises a random access preamble.

49. A method in a wireless communication network for receiving and transmitting signals between a first radio node and a second radio node, wherein the first radio node is a server radio node and the second radio node is a client radio node or vice versa, the method comprising:
 determining a receiving time-spatial sweeping pattern for the first radio node, based on an index of a beacon beam in a beacon sweeping pattern used by the server radio node to transmit beacon beams;
 determining a transmitting time-spatial pattern for the second radio node based on a predefined rule, the predefined rule defining a timing at which the client radio node transmits said signal to the server radio node, based on the index;
 transmitting a signal from the second radio node according to the determined transmitting time-spatial pattern;
 detecting the signal in the first radio node according to the defined receiving time-spatial sweeping pattern of the first radio node; and
 sending a response from the first radio node to the second radio node when the signal is detected.

50. The method of claim 49, further comprising re-transmitting the signal from the client radio node to the server radio node according to a fall-back transmitting time-spatial pattern when no response is received from the server radio node.

* * * * *